United States Patent [19]

Squiers

[11] 3,740,585

[45] June 19, 1973

[54] POWER CONTROL SYSTEM

[75] Inventor: David J. Squiers, Attleboro Falls, Mass.

[73] Assignee: Texas Instrument Incorporated, Dallas, Tex.

[22] Filed: Sept. 13, 1971

[21] Appl. No.: 180,039

[52] U.S. Cl. .............. 307/252 B, 307/293, 323/24, 323/35

[51] Int. Cl. ... H03k 17/66, H03 17/72, H03k 17/28

[58] Field of Search ............ 307/246, 252 B, 252 M, /252 N, 252 Q, 252 T, 252 UA, 284, 293, 305; 317/148.5 B, DIG. 8, 141 S; 323/24, 25

[56] References Cited

UNITED STATES PATENTS

| | | | |
|---|---|---|---|
| 3,335,291 | 8/1967 | Gutzwiller | 307/252 B |
| 3,579,096 | 5/1971 | Buchanan, Jr. | 323/24 X |
| 3,450,891 | 6/1969 | Riley | 307/252 B X |
| 3,515,902 | 6/1970 | Howell | 307/252 T |
| 3,543,141 | 11/1970 | Lawson | 323/24 |
| 3,558,922 | 1/1971 | Galloway | 307/252 B |
| 3,590,365 | 6/1971 | Nelson | 323/24 X |
| 3,603,843 | 9/1971 | Clements | 307/252 T X |
| 3,619,656 | 11/1971 | Domke | 307/252 B X |
| 3,639,782 | 2/1972 | Lord | 307/252 T |

*Primary Examiner*—John W. Huckert
*Assistant Examiner*—L. N. Anagnos
*Attorney*—Harold Levine, Edward J. Connors, Jr., John A. Haug et al.

[57] ABSTRACT

Control of the power being selectively applied to a plurality of similar or dissimilar loads connected in parallel relationship is effected. Switching networks are provided for selectively controlling the application of power to each of the loads. Eachof the switching networks includes a selectively energizable a.c. power switch for coupling the load to an a.c. power source, the a.c. power switch having a control terminal for controlling its conduction. A first trigger means is coupled to the control terminal of the a.c. power switch for supplying energizing signals thereto for rendering the a.c. power switch conductive only during a.c. half cycles of a first predetermined polarity, while maintain the control terminal electrically isolated from the a.c. power source during a.c. half cyclds of a second opposite predetermined polarity. A second trigger means is coupled to the control terminal for supplying energizing signals thereto in orderto render the a.c. power switch conductive during a.c. half cycles of a second opposite predetermined polarity only responsive to conduction of the a.c. powerswitch during a.c. half cycles of the first predetermined polarity.

11 Claims, 2 Drawing Figures

PRIOR ART

INVENTOR
BY David J. Squiers
Gerald B. Epstein Att'y.

POWER CONTROL SYSTEM

The present invention relates generally to power control systems and more particularly is directed to a power control system in which positive supply and disruption of the power to a load is assured.

Various industrial power control systems are currently available responsive to input signals in order to control switch networks or branches for selectively energizing a load in accordance with the information furnished by a suitable input signal source. It is often desirable to sequentially or simultaneously effect control of the power being supplied to a number of load circuits which are connected in parallel with a source of a.c. power. For example, in industrial relay logic systems utilized for controlling the operation of a manufacturing process, or the like, it may be desired to utilize a plurality of parallel connected switch circuits for achieving the requisite selective power control. However, certain difficulties have arisen particularly in connection with effecting the disruption of the power being supplied due to the generation of feedback signals caused by phase differences between the applied load signals. Such feedback signals often cause inadvertent re-energization of a switching network which had previously been de-energized, thereby causing the switching network to latch in a conductive state, necessitating utilization of additional or auxiliary power disruption means. This phenomenon may occur particularly, when several highly inductive loads are connected in parallel relationship with a single a.c. power source, causing loss of gate control of the switching networks.

Accordingly, it is an object of the present invention to provide an improved power control system in which positive control of the application and disruption of power to a load is achieved.

It is another object of the present invention to provide an improved power control system adapted for controlling the application of power to one or more load circuits connected in parallel relationship with a source of power.

It is a further object of the present invention to provide an improved power control system which is extremely durable in use and versatile and accurate in operation.

Figure 1:
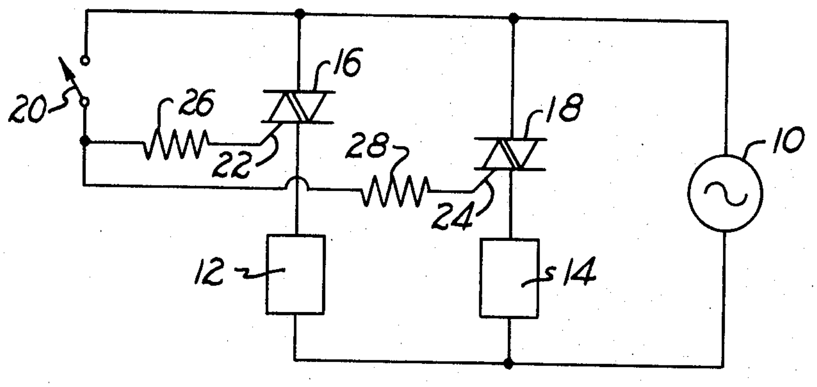
Figure 2:
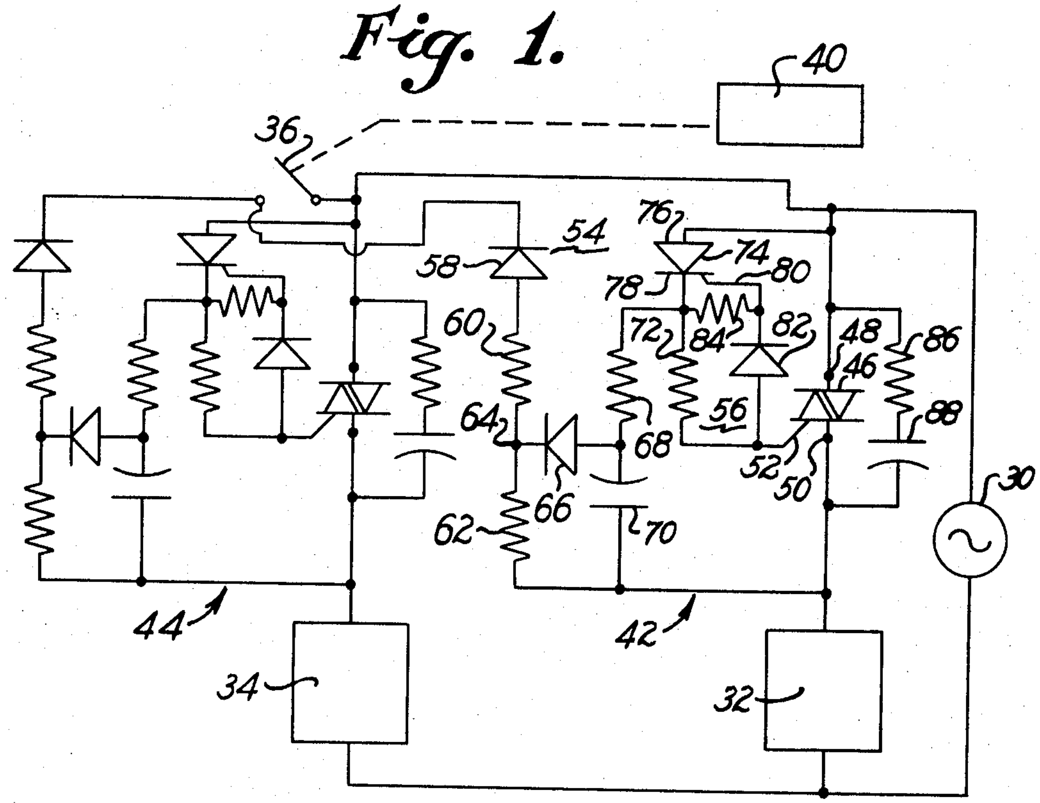

Various additional objects and advantages will become readily apparent from the following detailed description and accompanying drawings wherein:

FIG. 1 is an electrical schematic circuit diagram of a typical prior art control system; and FIG. 2 is an electrical schematic circuit diagram of a control system in accordance with the principles of the present invention.

Referring initially to FIG. 1, a typical prior art control system is illustrated. More particularly, as shown an a.c. power source 10 is provided for supplying power to a pair of parallel connected load circuits 12, 14. Control of the application of power to the loads 12, 14 is effected by a pair of a.c. power switches 16, 18, illustrated as triacs. Control of the conduction of the triacs is effected by a selectively operable switch 20 which effects the application of trigger signals to the gates 22, 24 of the respective triacs 16, 18 through associated gate resistors 26, 28. In order to effect energization of the loads 12, 14, the switch 20 is closed thereby effecting the application of trigger signals to the gates of the respective triacs, which are rendered conductive and thereby effect the application of power to their associated loads. However, when it is desired to effect disruption of the power being applied to the loads by opening of the switch 20 certain problems may occur. In this regard due to the phase difference between the signals applied across the respective loads particularly, when the loads are dissimilar, the different phase angles of the signals across the respective gate-anode circuits of each of the triacs may be fed back to the other triac causing continued triggering and conduction thereof with the triacs being latched in a conductive condition, even though the switch 20 is maintained open. For example, upon opening of the switch 20, the signal across load 14 may be substantially out of phase with the signal applied across load 12 and as a result the voltage signal across the gate-anode circuit of triac 18 may be fed back through its gate resistor 28 and thence through the gate resistor 26 of triac 16 to the gate 22 thereof maintaining triac 16 latched in a conductive state. Such a situation can, of course, lead to numerous difficulties and although various solutions have been proposed for eliminating this type of situation such problems continue to exist.

However, in accordance with the principles of the present invention a unique control system is illustrated in FIG. 2 which overcomes these difficulties. More particularly, in the illustrated embodiment energization is provided by a suitable a.c. power source 30 which may comprise a typical 115 volt, 60 hz power source to a pair of selectively energizable, parallel connected loads 32, 34 for supplying power thereto in response to closure of an associated switch means 36. Control of the switch 36 may be effected in any convenient manner and may be effected manually, or by the provision of a suitable input signal source 40 operatively connected to the switch for effecting opening and closing thereof in order to control the supply of power to the loads 32, 34. The loads 32, 34 may be generally similar or dissimilar and may comprise relay coils or solenoids for controlling the operation of logic relay systems, mechanical switch contacts for use in controlling other associated equipment, etc. Regardless of the particular load utilized positive application and disruption of the power being supplied thereto is achieved in accordance with the present invention. In this connection it may be noted that two loads 32, 34 are illustrated connected in parallel relationship with each other, although, if desired, a single load may be employed or a relatively large number of parallel connected loads may be employed utilizing a system such as that illustrated for controlling the power being supplied thereto.

As shown, the power being supplied to each of the loads 32, 34 is controlled by an associated control network, illustrated generally by the reference numerals 42, 44 as shown. Since each of the control networks 42, 44 are essentially identical only the control network 42 is described in detail hereinafter. The network 42 is adapted to effect the selective energization of the load 32 and includes an a.c. power switch 46 having a pair of power terminals 48, 50 and a control terminal 52. The a.c. power switch 46 is adapted to couple the load 32 to the a.c. power source 30 in response to conduction thereof and in this connection one of the power terminals 48 is shown connected to the a.c. power source 30, while the other power terminal 50 is shown connected to the load. First trigger means 54 is coupled to the control terminal 52 for supplying energizing signals thereto from the a.c. power source for rendering the a.c. power switch 46 conductive only during a.c. half cycles of a first predetermined polarity, while maintaining the control terminal electrically isolated from the a.c. power source during a.c. half cycles of a second opposite predetermined polarity. In addition, second trigger means 56 are provided also coupled to the control terminal 52 for supplying energizing signals thereto to render the a.c. power switch conductive during a.c. half cycles of the second predetermined polarity responsive to previous conduction of the a.c. power switch during a.c. half cycles of the first predetermined polarity.

More particularly, upon closure of the switch 36 the control terminal 52 is adapted to receive energizing signals from the first trigger means 54, which, as shown, includes a half-wave rectifier diode 58 connected in a predetermined polarity relationship with respect to the a.c. power source 30. In the illustrated embodiment the diode 58 has its cathode connected to the a.c. power supply 30 such that it will only transmit negative polarity signals therethrough, while blocking positive polarity signals, thereby maintaining the control terminal 52 electrically coupled to the power supply during negative half cycles and isolated from the power supply during positive half cycles of the applied a.c. signal. The diode 58 is connected to the control terminal 52 through a voltage divider configuration including a pair of resistors 60, 62 having their junction 64 coupled to another diode 66 connected in the same polarity configuration as the diode 58. The diode 66 in turn is connected to the junction between a parallel connected resistor 68 and capacitor 70. The resistor 68 is connected to the gate terminal 52 through a gate resistor 72 for transmitting trigger signals to the gate 52 on negative half cycles and cooperates with the capacitor 70 to define a time delay network for effecting the selective application of trigger signals on positive half cycles, as will be more fully explained hereinafter. In the illustrated embodiment the a.c. power switch 46 preferably comprises a triac and hence upon the occurrence of a negative half cycle of applied power a trigger signal is applied to its gate electrode 52 through the half-wave rectifier diode 58, the voltage divider junction 64, the rectifier diode 66, the resistor 68, and the gate resistor 72 to render the triac conductive, whereby power is applied to the load 32. However, since the rectifier diode 58 functions to block positive signals, as the applied a.c. signal passes through the zero point the triac 46 will no longer be supplied with trigger signals by the rectifier diode 58 and will be rendered non-conductive absent the application of trigger signals thereto during the positive half cycle by the second trigger means 56.

In accordance with an important feature of the present invention, unless the triac 46 has been supplied with trigger signals and rendered conductive during the negative half cycle, it cannot be supplied with trigger signals and rendered conductive during the positive half cycle, thereby providing absolute assurance of disruption of the power being supplied to the load when the triac is de-energized. In this regard the second trigger means includes a unidirectional switch means 74 which preferably comprises a silicon controlled rectifier having an anode 76 connected to the a.c. power supply in parallel with the anode 48 of the triac 46, having a cathode 78 connected to the gate 52 of triac 46 through the gate resistor 72 for selectively supplying trigger signals thereto during positive a.c. half cycles, and having a gate 80 connected to the capacitor 70 through the anode-gate circuit of the triac 46 for receiving trigger signals upon discharge of the capacitor 70, whereby the silicon controlled rectifier 74 is rendered conductive to supply trigger signals to the triac 46 to maintain the triac conductive during positive a.c. half cycles. More particularly, during the application of a negative a.c. half cycle across the half-wave rectifier diode 58, trigger signals are applied to the gate 52 of the triac 46, as previously explained. In addition, the capacitor 70 is charged during this negative a.c. half cycle since the junction between capacitor 70 and resistor 68 is connected to the rectifier diode 66 as shown. As a result a negative charge appears at this junction while the opposite terminal of the capacitor which is coupled to the cathode 78 of the silicon controlled rectifier 74 through the anode-gate circuit of the triac is positively charged. At a time adjacent to initiation of conduction of the triac 46 during the negative a.c. half cycle the capacitor 70 begins to discharge through the anode-gate circuit of the conductive triac 46 and through a rectifier diode rectifier conductive. Consequently, the silicon controlled rectifier 74 supplies the anode-gate circuit of the triac 46 to the gate 80 of the silicon controlled rectifier 76. The time interval required for the discharge cycle is determined by the capacitance of capacitor 70, as well as the resistance of resistor 68 coupled thereto and is selected such that the discharge is maintained at the initiation of the positive a.c. half cycle. Thus, as the positive half cycle is initiated, the diode 58 becomes nonconductive, but the pulse provided by discharge of the capacitor 70 to the gate 80 of silicon controlled rectifier 74 renders the silicon controlled rectifier 74 supplies trigger signals through its anode-cathode circuit and through gate resistor 72 to the gate 52 of triac 46, thereby maintaining triac 46 in a conductive condition so as to effect continued application of power to the load 32. In addition, in order to obtain increased temperature stabilization a gate resistor 84 may be connected across the gate-cathode junction of the silicon controlled rectifier 74. Similarly, as the applied a.c. power signal passes through the next negative a.c. half cycle, the positive signal is removed from the anode 76 of silicon controlled rectifier 74 rendering the silicon controlled rectifier nonconductive, but causing the half-wave rectifier diode 58 to become conductive thereby continuing to apply trigger signals to the gate 52. In this manner the triac 46 is continually maintained conductive as long as the switch 36 remains closed. However, if the switch 36 is opened the isolation provided by the rectifier diode 58 prevents the application of trigger signals to the triac gate 52 regardless of the presence of out-of-phase signals across the parallel loads 32, 34. Thus, the capacitor 70 cannot be charged to a level sufficient to trigger the silicon controlled rectifier 74 into conduction and power to the load is positively disrupted, since the triac cannot be rendered conductive. In addition, in order to further enhance the transient insensitivity of the network 42 a series connected resistor 86 and capacitor 88 are connected across the triac anodes or power terminals 48, 50 to function as a dv/dt suppression network so as to prevent the occurrence of high voltage transients across the triac power terminals from effecting inadvertent turn on of the triac.

Thus, it may be readily seen that a cycle of operation whereby the triac supplies power to the load 32 may be only initiated when the switch 36 is in a closed state so as to permit the application of power through the rectifier diode 58 on negative half cycles which effects energization of the silicon controlled rectifier 74 on positive half cycles. In addition, the subsequent switch network 44 may be seen to be essentially identical to the network 42 and operates in the same manner upon closure and opening of the switch means 36. Accordingly, a desired number of loads may be selectively energized substantially independently of each other, while completely alleviating problems of inadvertent latching on of the switch circuitry due to feedback signals resulting from different phase angles, of the signals across the loads due to load dissimilarity, or the like.

Thus, a unique power control system has been shown and described in detail in which positive disruption of the power being supplied to one or more loads is effected regardless of interaction between the load circuits and adjacent switching networks.

Various changes and modifications in the above-described embodiment will be readily apparent to those skilled in the art and any of such changes or embodiments are deemed to be within the spirit and scope of the present invention as set forth in the appended claims.

What is claimed is:

1. A control system for effecting the selective energization of a load comprising a selectively energizable a.c. power switch having a control terminal and a pair of power terminals for coupling the load to an a.c. power source, one of said power terminals being connectable to the a.c. power source and the other power terminal being connectable to the load, first trigger means coupled to said control terminal for supplying energizing signals thereto from the a.c. power source to render said a.c. power switch conductive only during a.c. half cycles of a first predetermined polarity while maintaining said control terminal electrically isolated from the a.c. power source during a.c. half cycles of a second predetermined polarity opposite to said first predetermined polarity, said first trigger means includes a half-wave rectifier diode coupled to said control terminal of said a.c. power switch for supplying energizing signals thereto of said first predetermined polarity for rendering said a.c. power switch conductive, and second trigger means coupled to said control terminal for supplying energizing signals thereto to render said a.c. power switch conductive during a.c. half cycles of said second predetermined polarity responsive to conduction of said a.c. power switch during a.c. half cycles of said first predetermined polarity, said second trigger means includes a selectively energizable unidirectional power switch having a pair of power terminals, one of said power terminals being connected to the a.c. power source in parallel relationship with said one power terminal of said a.c. power switch and the other power terminal being coupled to said control terminal of said a.c. power switch for supplying trigger signals thereto when said unidirectional power switch is in a conductive state, said unidirectional power switch includes a control element adapted to receive trigger signals subsequent to the application of energizing signals to said control terminal of said a.c. power switch, whereby said unidirectional power switch is selectively rendered conductive responsive to energization of said a.c. power switch, energy storage means comprising a capacitor is coupled to said half-wave rectifier diode for storing energy while said half-wave rectifier diode is supplying energizing signals to said control terminal of said a.c. power switch, said energy storage means is coupled to said control element of said unidirectional switch and is adapted to discharge stored energy therethrough for a predetermined time for rendering said unidirectional power switch conductive during a.c. half cycles of said second predetermined polarity, thereby maintaining said a.c. power switch conductive, discharge of said capacitor is initiated during the a.c. half cycle of said first predetermined polarity when said a.c. power switch is in a conductive state to effect energization of said unidirectional power switch upon the initiation of the a.c. half cycle of said second predetermined polarity.

2. A control system in accordance with claim 1 wherein said unidirectional switch means is polarity sensitive and is adapted to be rendered conductive only during a.c. half cycles of said second predetermined polarity.

3. A control system in accordance with claim 1 wherein said a.c. power switch comprises a triac and the control terminal of said a.c. power switch comprises the gate of said triac.

4. A control system in accordance with claim 3 wherein said unidirectional power switch comprises a silicon controlled rectifier, the power terminals of said unidirectional power switch comprising the anode and cathode of said silicon controlled rectifier and the control element of said unidirectional power switch comprising the gate of said silicon controlled rectifier.

5. A control system in accordance with claim 4 wherein one of said power terminals of said silicon controlled rectifier is coupled to the gate of said triac for supplying trigger signals to said triac gate upon conduction of said silicon controlled rectifier during a.c. half cycles of said second predetermined polarity.

6. A control system in accordance with claim 5 wherein said capacitor is coupled to the gate of said silicon controlled rectifier through the anode-gate circuit of said triac for discharging therethrough subsequent to conduction of said triac.

7. A control system in accordance with claim 6 wherein said half-wave rectifier diode is coupled to one terminal of said capacitor for charging said capacitor during conduction of said half-wave rectifier diode and the other terminal of said capacitor is coupled to the gate of said silicon controlled rectifier through the anode-gate circuit of said triac for discharging therethrough and rendering said silicon controlled rectifier conductive.

8. A control system in accordance with claim 7 wherein a diode is connected between the anode-gate circuit of said triac and said gate of said silicon controlled rectifier, said diode blocking a.c. signals of said second predetermined polarity.

9. A control system for selectively energizing at least one load comprising a unidirectional current supply means for transmitting energizing signals of a first predetermined polarity from an a.c. power source only on alternate half cycles of applied a.c. power, a selectively energizable bi-directional power switch having a control element for controlling energization thereof and a pair of power terminals, said control element being coupled to said unidirectional current supply means for receiving said energizing signals of said first predetermined polarity, one of said power terminals being connected to the a.c. power source and the other of said power terminals being connected to a load for supplying electrical signals thereto when said bi-directional power switch is in a conductive state, selectively energizable energy storage means coupled to said unidirectional current supply means for storing energy responsive to the supply of energizing signals of said first predetermined polarity to said control element, and a selectively energizable unidirectional power switch means having a pair of power terminals and a control terminal for controlling conduction thereof, one of said power terminals being connected in parallel relationship with said one power terminal of said bi-directional power switch, another of said power terminals being coupled to said control element of said bi-directional power switch means for selectively supplying energizing signals thereto upon conduction of said unidirectional power switch means, said control terminal of said unidirectional power control means being coupled to said energy storage means for receiving energizing signals therefrom rendering said unidirectional power switch means conductive on alternate half cycles of a second predetermined polarity opposite to said first predetermined polarity, thereby supplying energizing signals to said control element of said bi-directional power switch during alternate a.c. half cycles of said second predetermined polarity, said energy storage means comprises a capacitor having one terminal coupled to said unidirectional current supply means for receiving charging signals therefrom during a.c. half cycles of said first predetermined polarity and having its other terminal coupled to the control terminal of said unidirectional power switch for discharging therethrough to render said unidirectional power switch conductive during a.c. half cycles of said second predetermined polarity.

10. A control system in accordance with claim 9, wherein a resistor is provided connected to said capacitor to define a time delay network having a predetermined time constant, whereby discharge of said capacitor is effected during the a.c. half cycle of said first predetermined polarity and maintained at the initiation of the a.c. half cycle of said second predetermined polarity.

11. A control system in accordance with claim 10 wherein said unidirectional power switch means comprises a silicon controlled rectifier and said bi-directional power switch comprises a triac.

* * * * *